: US 10,235,589 B2
(45) Date of Patent: Mar. 19, 2019

(54) SMALL MARITIME TARGET DETECTOR (71) Applicant: The Johns Hopkins University, Baltimore, MD (US)

(72) Inventors: Chad M. Hawes, Finksburg, MD (US); David N. Barsic, Laurel, MD (US); Howard C. Schoeberlein, Ellicott City, MD (US); Eric D. Jansing, Cathedral City, CA (US); Michael E. Nord, Columbia, MD (US); Eric C. Larsen, Hanover, MD (US)

(73) Assignee: The Johns Hopkins University, Baltimore, MD (US)

( * ) Notice: Subject to any disclaimer, the term of this patent is extended or adjusted under 35 U.S.C. 154(b) by 233 days.

(21) Appl. No.: 15/258,269

(22) Filed: Sep. 7, 2016

(65) Prior Publication Data

US 2017/0069062 A1 Mar. 9, 2017

Related U.S. Application Data

(60) Provisional application No. 62/215,402, filed on Sep. 8, 2015.

(51) Int. Cl.
*G06K 9/00* (2006.01)
*G06K 9/32* (2006.01)

(52) U.S. Cl.
CPC ....... *G06K 9/3233* (2013.01); *G06K 2209/21* (2013.01)

(58) Field of Classification Search
CPC ...... G06F 3/011; G06F 3/0304; A63F 13/213; A63F 13/24; A63F 13/426; A63F 13/428; A63F 13/655; A63F 13/00; G06T 7/73
See application file for complete search history.

(56) References Cited

U.S. PATENT DOCUMENTS

2016/0364881 A1* 12/2016 Mallinson ................. G06T 7/20

* cited by examiner

*Primary Examiner* — Duy M Dang
(74) *Attorney, Agent, or Firm* — Todd R. Farnsworth (57) ABSTRACT

A detection system may include processing circuitry configured to receive synthetic aperture radar image data that has been or will be divided into a plurality of image tiles and perform initial screening to reject image tiles not having a threshold level of energy. The processing circuitry may be further configured to perform advanced screening to eliminate image tiles based on background noise to generate screened image tiles and generate a feature vector for an energy return of the screened image tiles. The processing circuitry may also be configured to determine a classification of a target associated with the feature vector.

13 Claims, 4 Drawing Sheets

SMALL MARITIME TARGET DETECTOR

CROSS-REFERENCE TO RELATED APPLICATIONS

This application claims priority to and the benefit of U.S. Provisional Application Ser. No. 62/215,402 filed on Sep. 8, 2015, the entire contents of which are hereby incorporated herein by reference.

STATEMENT OF GOVERNMENTAL INTEREST

This invention was made with Government support under contract number 08-C-3193 awarded by the U.S. government. The Government has certain rights in the invention.

TECHNICAL FIELD

Exemplary embodiments of the present disclosure generally relate to image screening and detection technology, and more specifically relate to employment of screening and detection technology that may assist in the identification and classification of objects of interest, including relatively small objects, within image data gathered using synthetic aperture radar.

BACKGROUND

Synthetic aperture radar (SAR) is a technology that can create relatively detailed images of objects using radar. In particular, SAR typically employs a moving platform (e.g., an aircraft or a satellite) to generate a plurality of images of an area as the platform upon which SAR components are mounted passes over the area. The SAR generates radar pulses that return from targets or other features located in the area and the returns are used to effectively define a large antenna aperture based on the distance traveled and the time over the target area. With the large antenna aperture, relatively high resolution images can be created with relatively small physical antenna sizes.

The radar returns or echoes that are received relative to the successive pulses of radio waves illuminating the target area are recorded for image formation processing and image analysis. The pulses that are transmitted and received can have different wavelengths depending on the use case. The image data that is gathered can then be processed for remote sensing, mapping, or other uses.

However, as the ability to obtain high resolution images of objects on the ground improves, the amount of data that must be analyzed and the complexity associated with analyzing the data also increases. Thus, it is necessary to develop techniques for analyzing the massive amounts of high resolution data in a way that can enhance the value of the results of the analysis.

BRIEF SUMMARY OF SOME EXAMPLES

Some example embodiments may enable the provision of a system capable of undertaking the potentially complicated task of isolating specific objects of interest from the image data that can be obtained from SAR imagery. In this regard, some example embodiments may define a series of image processing steps for improving screening and classification performance. In some cases, example embodiments may employ a screening process to filter image data to isolate a reduced set of candidate detections so that a feature extractor and classifier can operate on the reduced set to perform object classification for relatively small objects in maritime environments.

In one example embodiment, a detection system is provided. The detection system may include processing circuitry configured to receive synthetic aperture radar image data, which has been or will be divided into a plurality of overlapped or non-overlapped image tiles, and perform initial screening to reject image tiles not having a threshold level of energy. The processing circuitry may be further configured to perform advanced screening to eliminate image tiles based on background noise characteristics to generate screened image tiles for which a feature vector is calculated to characterize the energy return in the screened image tiles. The processing circuitry may also be configured to determine a classification of a target associated with the feature vector.

In another example embodiment, a method of detecting targets is provided. The method may include receiving synthetic aperture radar image data, dividing it into a plurality of image tiles, performing initial screening to reject image tiles not having a threshold level of energy, and performing advanced screening to eliminate image tiles based on background noise to generate screened image tiles. The method may further include generating a feature vector describing characteristics of an energy return in screened image tiles and determining a classification of a target associated with the feature vector.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As indicated above, some example embodiments may enable the provision of a mechanism by which to analyze SAR image data to isolate targets or objects of interest therein. Accordingly, example embodiments may utilize SAR image data gathered by any method to perform such analysis. The analysis may include a multi-stage process in which image data is screened to perform feature extraction only in portions of the image where candidate targets are located. After feature extraction, data associated with candidate objects can be classified using a trained classifier. The result may be a score for candidate objects indicating the type (or classification) of an object of interest. In some cases, the object of interest may have a particular shape associated with a specific object or type of object. Thus, the screening process and classification may be accomplished utilizing feature criteria or characteristic criteria that are pre-learned based on the known characteristics of corresponding targets of interest.

Figure 1:
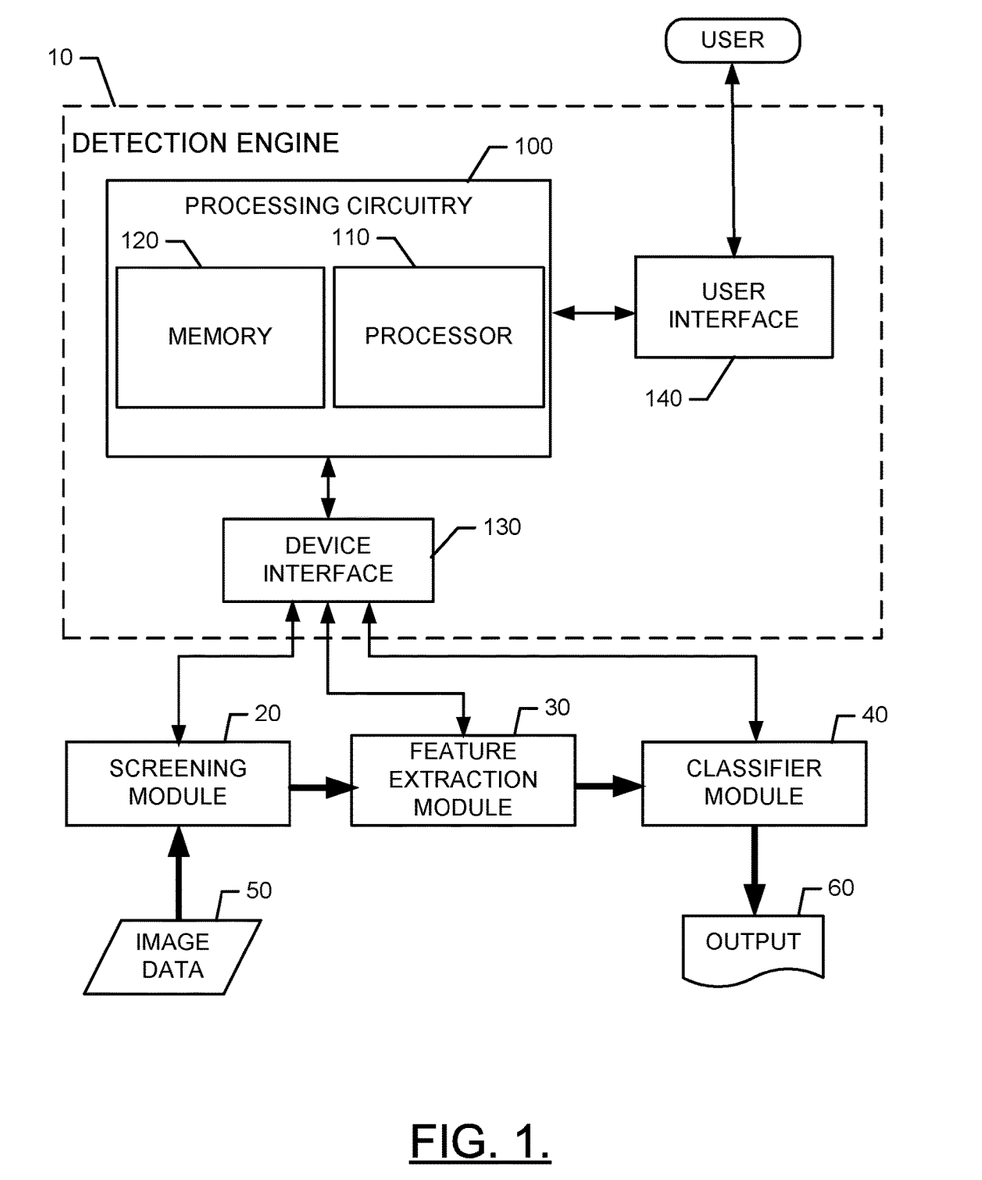
FIG. 1 illustrates a block diagram showing one example of a detection system of an example embodiment.

The process output may be generated based on analysis of a set of overlapping image chips, corresponding to portions of images being analyzed. The image chips may initially be screened before further and more complex analysis is performed. In particular, image chips without energy returns indicative of having a potential target of interest therein may be ignored relative to the more complex processing that is performed on image chips that include areas having energy returns that match certain physical criteria. The more complex processing may include feature extraction and classification processes that ultimately reduce the information from raw SAR imagery to detection reports that represent a six to seven order of magnitude reduction in information in some cases. The analysis may be performed by a detection system comprising various hardware and/or software components. FIG. 1 illustrates a block diagram showing one example of a detection system of one example embodiment.

In the example of FIG. 1, the detection system is embodied as a computer controlled device. Thus, for example, the detection system may include various modules that may operate under the control of a detection engine 10 that may be referred to as a maritime target (or object) finder. The detection engine 10 may be configured to control operation of a screening module 20, a feature extraction module 30 and a classifier module 40. Image data 50 may be provided to the screening module 20, which may condition the image data 50 and screen individual portions thereof (e.g., "chips" or image tiles) to determine which portions should be further processed by the feature extraction module 30. The feature extraction module 30 may perform analysis on the image data 50 that has been conditioned or pre-processed in order to identify candidate detections or targets/objects of interest. The candidate detections may have a decision fusion process performed thereon before the classifier module 40 generates an output 60 that can be provided to an analyst or otherwise reviewed by authorized parties.

Each respective module may perform one or more functions that will be described in greater detail below. However, it should be appreciated that although this example is described in terms of separate modules corresponding to various functions performed, some examples may not necessarily utilize modular architectures for employment of the respective different functions. Thus, for example, code may be shared between different modules, or the detection engine 10 itself may be configured to perform all of the functions described as being associated with the modules described herein.

In an example embodiment, the detection engine 10 may coordinate or control operation of the modules so that, for example, image data 50 is pre-processed in the screening module 20. The screening module 20 may be configured to receive the image data 50 and employ screening techniques to determine which image tiles or chips should receive further processing. As such, upon receipt of complex SAR imagery in the form of the image data 50, the screening module 20 may be configured to perform one or more screening techniques on each image tile of the image data 50 to determine if each respective image tile is a candidate for further screening, or further processing (e.g., by the feature extraction module 30), as described in greater detail below. Image tiles that "pass" the screening processes (or processes), or are selected for further processing based on the energy contained therein, may then be provided to the feature extraction module 30, where feature vectors are generated for energy returns located in the respective image tiles. Thereafter, the feature vectors may be used by the classifier module 40 to classify the energy returns as corresponding (or most likely corresponding) to a particular class of target (or object), as described in greater detail below.

In some embodiments, the image data 50 may be provided in real time, substantially real time, or from a storage buffer or memory device. The image data 50 may be converted or otherwise provided in a consistent format or file standard. Moreover, each image tile associated with the image data may be processed so that energy is normalized in each respective chip or image tile. The screening module 20 may then be configured to perform screening functions for the detection system. In an example embodiment, the screening module 20 may be configured to perform a two-level screening process including initial screening (or simple screening) and advanced screening (or smart screening).

The initial screening process may compare energy levels detected in each image tile to a threshold level. Image tiles that exceed the threshold level may be selected as image tiles for which advanced screening is to be performed. Given that the energy levels in each image tile are normalized, the threshold level may, in some cases, be set at three to four standard deviations from the normalized energy level, where the normalized energy level may be computed for an individual image tile or may be computed from the entire image. Thus, exceeding the threshold level may normally only happen when at least one target or object is located in the image tile having summed energy returns exceeding three to four standard deviations from the normalized energy level. However, noise levels may cause some image tiles to have false positives from time to time. Accordingly, the advanced screening process may be provided to further ensure that image tiles that exceeded the threshold level during initial screening are further screened to eliminate image tiles where noise likely caused the threshold level to be exceeded.

The advanced screening process may only be employed on the selected image tiles from the initial screening process (i.e., the image tiles for which the threshold level was exceeded. The advanced screening process may be performed based on statistical testing done previously to evaluate background noise levels. Thus, the advanced screening process may employ statistical consistency checks to eliminate selected image tiles from the initial screening process where it is statistically likely that background noise caused the threshold level to be exceeded. Selected image tiles that are not thrown out by the advanced screening process may be referred to as screened image tiles since the screened image tiles have been retained for further analysis after the full screening process (i.e., both initial and advanced screening) performed by the screening module 20.

The screened image tiles are then provided to the feature extraction module 30 for feature extraction. In an example embodiment, the feature extraction module 30 may be embodied as a support vector machine (SVM) that is trained via supervised learning to generate feature vectors when provided sample data (e.g., screened image tiles). Thus, for example, the feature extraction module 30 may be configured to generate an output that characterizes energy in each image tile among those processed (i.e., each screened image tile) in terms of a feature vector.

The feature vector generated by the feature extraction module 30 for each respective image tile among those processed by the feature extraction module 30 (i.e., the screened image tiles), may then be communicated to the classifier module 40. The classifier module 40 may be trained to produce a score that is indicative of the type of target detected in each respective image tile. Given that the feature extraction module 30 and the classifier module 40 each consume processing power, it can be appreciated that it is advantageous to minimize the number of tiles upon which the feature extraction module 30 and the classifier module 40 operate. Accordingly, the detection engine 10 is configured (e.g., via the screening module 20) to intelligently limit the operation of processing circuitry 100 used to embody or otherwise control the various modules of the detection engine 10.

As shown in FIG. 1, the detection engine 10 may include or otherwise be in communication with processing circuitry 100 that is configurable to perform actions in accordance with example embodiments described herein. As such, for example, at least some of the functions attributable to the detection engine 10 may be carried out by or otherwise instructed by the processing circuitry 100. The processing circuitry 100 may therefore provide the hardware for hosting software to configure the system for machine learning and machine driven analysis techniques consistent with example embodiments. Detection of targets/objects of interest and classification of such targets/objects (e.g., via delineation of labels and sometimes also confidence scores for consumption by analysts or other authorized parties) may then be accomplished using the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard).

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as one or more instances of a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, printer, one or more buttons or keys (e.g., function buttons), and/or other input/output mechanisms (e.g., keyboard, touch screen, mouse, microphone, speakers, cursor, joystick, lights and/or the like). The user interface 140 may display information indicating an identity or certain characteristics of a data set (e.g., including images or results of analyzing images) being processed by the detection engine 10. The characteristics of the data set may then be processed and information associated therewith may be presented on a display of the user interface 140 based on instructions executed by the processing circuitry 100 for the analysis of the data according to prescribed methodologies and/or algorithms. Moreover, in some cases, the user interface 140 may include options for selection of one or more reports to be generated based on the analysis of a given data set.

The device interface 130 may include one or more interface mechanisms for enabling communication with other external devices (e.g., output devices, input devices and/or the like) or internal functional components of the detection system. In some cases, the device interface 130 may be any means such as a device or circuitry embodied in either hardware, or a combination of hardware and software that is configured to receive and/or transmit data from/to devices in communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the detection engine 10 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns, image data, feature data, processing algorithms and/or the like to be employed for the execution of example embodiments. Among the contents of the memory 120, applications may be stored for execution by the processor 110 in order to carry out the functionality associated with each respective application. In some cases, the applications may include directions for control of the detection engine 10 to process image tiles of the image data 50 via the screening module 20, the feature extraction module 30 and the classifier module 40 to generate the output 60. The output 60 may include a classification indicative of an identity or type of target or object evaluated by the detection engine 10. In some cases, the applications may further include directions for generating the output 60 as one or more reports associated with analysis of the image data 50 as described herein.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the detection engine 10. As such, in some embodiments, the processor 110 (or the processing circuitry 100) may be said to cause each of the operations described in connection with the detection engine 10 and/or the modules by directing the detection engine 10 and/or the modules to undertake the corresponding functionalities responsive to execution of instructions or algorithms configuring the processor 110 (or processing circuitry 100) accordingly.

In an example embodiment, image data 50 captured in association with SAR may be stored (e.g., in the memory 120) or passed directly to the detection engine 10 in a suitable format. Thereafter, normalized data may be processed by the detection engine 10 using each of the modules described herein to enable the processing circuitry 100 to process the data in real time (or near real time) or to process the data after the data is extracted from memory.

In an example embodiment, each of the screening module 20, the feature extraction module 30, and the classifier module 40 may be any means such as a device or circuitry embodied in either hardware, or a combination of hardware and software that is configured to perform the corresponding functions of the screening module 20, the feature extraction module 30, and the classifier module 40 as described herein under the control of the processing circuitry 100.

Figure 2:
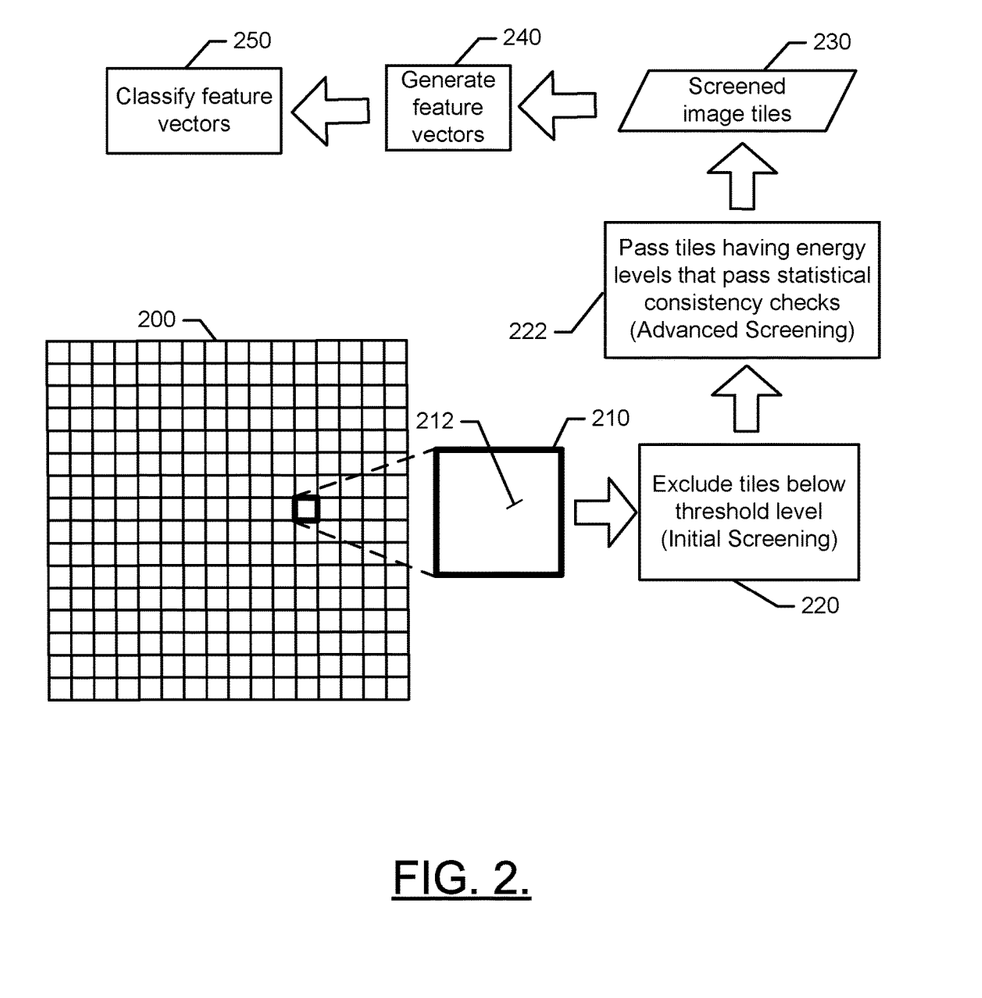
FIG. 2 illustrates SAR imagery that may be divided into a plurality of image tiles or chips and processed according to an example embodiment.

A high level description of the operation of an example embodiment will now be described in reference to FIG. 2. FIG. 2 illustrates SAR imagery 200 that is made up of a plurality of overlapping image tiles 210. In some cases, the SAR imagery 200 may be received as a single image or series of images, and the image or images may then be divided into the overlapping image tiles 210 by operation of an example embodiment. The overlapping image tiles 210 may be relatively heavily overlapped in both the range (e.g. 50% overlap) and azimuth (or along-track, e.g. 75% overlap) dimensions in some examples. Each of the image tiles 210 is fed through the screening module 20 for initial screening and advanced screening via the screening module 20 of an example embodiment. As shown in FIG. 2, an energy return 212 may appear as a streak formed in the azimuth or along-track dimension (e.g., along the track of the platform employing the SAR equipment). The energy return 212 may be summed along the along-track dimension and compared to the threshold level for initial screening such that any tiles that are below the threshold level can be excluded or discarded from further processing at operation 220. Thereafter, advanced screening may be conducted at operation 222. During advanced screening, only those tiles that pass statistical consistency checks to ensure that they are indicative of energy levels unlikely to be generated from background noise may be passed on for further processing. The tiles that pass the statistical consistency checks based on comparison to known random noise characteristics for the environment may be considered as screened image tiles 230, as described above. The screened image tiles 230 may then be passed on to the feature extraction module 30, which is configured to generate feature vectors at operation 240. The feature vectors are then provided to the classifier module 40, which classifies the feature vectors at operation 250. Accordingly, each of the image tiles 210 may be processed independently to determine which ones of the image tiles 210 are likely to include actual targets or objects worthy of additional processing power expenditures aimed at classifying the targets/objects. Each individual potential target signature (e.g., energy return 212) may then be converted into a feature vector for classification.

By employing the screening module 20 of an example embodiment, a reduced amount of information may ultimately be processed. In some cases, the reduction in information from raw SAR imagery to detection reports may represent six to seven orders of magnitude. This significant savings in information that is processed may save processing power and enable faster classification.

As discussed above, the output of the feature extraction module 30 may be provided to the classifier module 40 for multi-classifier operation to decide a classification type for each of the energy returns 212 that is processed within specific image tiles that were retained for feature extraction and/or classification processing from the larger input image (i.e., the screened image tiles 230). Target/object classification may be accomplished by using the feature vectors provided by the feature extraction module 30 with respect to each candidate detection (e.g., each energy return 212 that is passed through the screening module 20). The classifier module 40 may receive each feature vector as an input to a set of one or more trained classifier models. The trained classifier models may be trained to recognize characteristics of a target of interest based on the feature vector. Thus, for example, the trained classifier models may employ a best fit matching paradigm to ensure that every feature vector is binned or assigned to a corresponding classification type that most closely fits or matches the feature vector provided.

Figure 3:
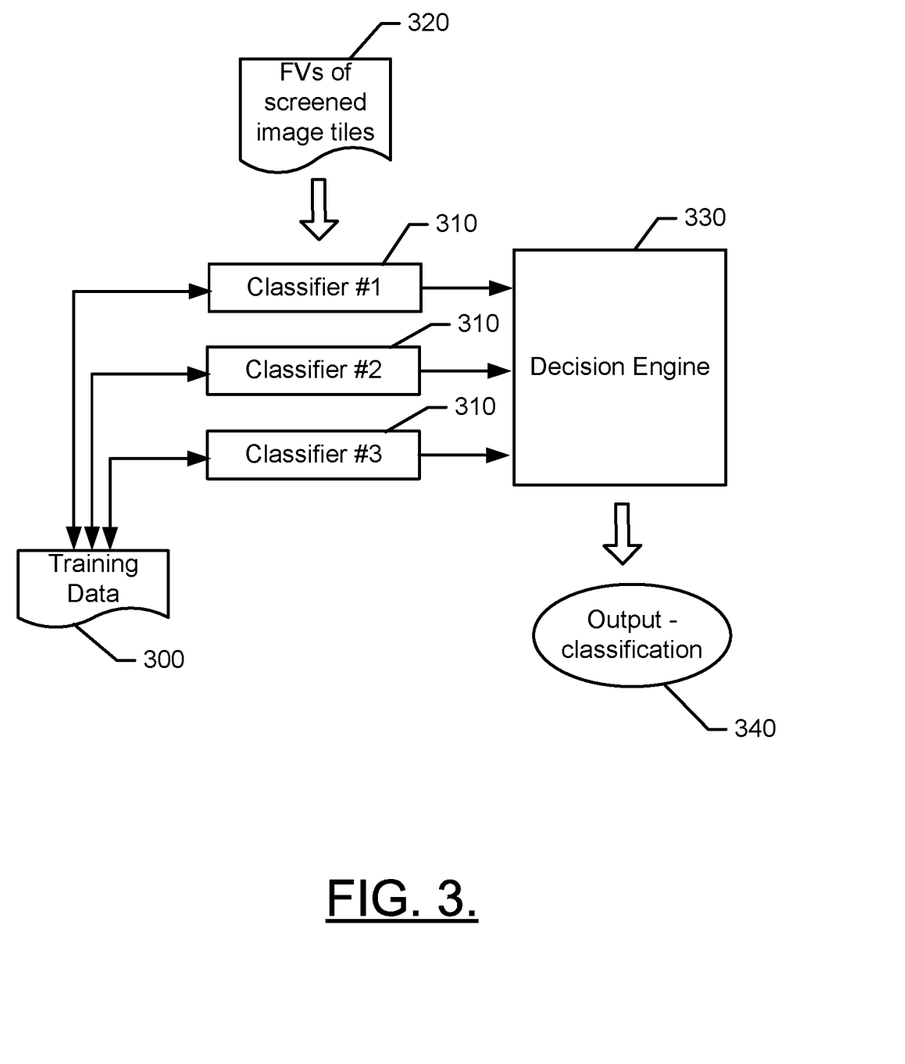
FIG. 3 illustrates a block diagram of operations associated with target classification according to an example embodiment.

FIG. 3 illustrates a block diagram of a classification process according to an example embodiment. As shown in FIG. 3, training data 300 may be provided to a plurality of classifiers 310 that may be parts of the classifier module 40. The classifiers 310 may be trained on the training data 300 to generate trained models that may receive the feature vectors of screened image tiles 320 and generate respective scores for each image tile for each one of the classifiers 310. The classifier generating the score indicating the highest match or likelihood of a match may determine the classification of the target in the corresponding image tile. In an example embodiment, a decision engine 330 may be provided to determine the classification based on the scores generated by the models. In this regard, for example, the decision engine 330 may decide which classifier had the best match, or at least which classification to assign to the target corresponding to the energy return 212 that caused the corresponding image tile to pass screening and be processed for feature extraction and classification. The decision engine 330 (which may also be defined by the processing circuitry 100) may then generate the classification as the output 340. Other scoring and classification paradigms are also possible. Thus, the example of FIG. 3 should be appreciated as being non-limiting and merely exemplary.

In an example embodiment, each classifier (e.g., classifier #1, classifier #2 and classifier #3) may correspond to a different target type. Each target type may be distinguished based on size, shape, and/or other characteristics. For example, classifier #1 could indicate small targets below a certain size. Classifier #2 could indicate larger targets above the certain size. Classifier #3 could indicate other types of targets or objects such as clutter, flotsam and jetsam, and/or the like. Specific other types of targets could also be detected with classifiers trained specifically to detect and classify such targets by the addition of other classifiers, or by retraining an existing classifier.

In an example embodiment, the classifier module 40 may be configured to perform additional processing on the output 60. In some embodiments, the additional processing that the classifier module 40 may be enabled to perform may include elimination of candidate detections that do not meet certain specified size, dimension ratio, or other user specified criteria. Additionally or alternatively, the classifier module 40 may be configured to eliminate candidate detections that do not meet specified classifier confidence criteria or that are labeled as clutter with a confidence level above a predefined threshold.

Example embodiments may therefore provide for a specific set of features to be used for classification purposes. The specific features may be identified via a trained set of classifiers that employ models to classify candidate detections as specific types of objects or targets. However, classification may only be conducted on a limited subset of image tiles, which have passed a rigorous screening. In this regard, for example, an initial screening process may be performed simply based on the amount of energy in an image tile exceeding a threshold level. However, since background noise may trigger some instances of exceeding the threshold level, a further (e.g., advanced) screening process may also be conducted to perform statistical consistency checks to attempt to further screen out instances where background noise is the apparent or most likely reason for triggering the threshold level to be exceeded. Accordingly, the relatively costly and time consuming operations of generating feature vectors and performing classification can be limited to a smaller subset of the data generated by SAR components. Robust detection and classification can therefore be performed in real-time, near real-time, or via post hoc processing on stored data.

Figure 4:
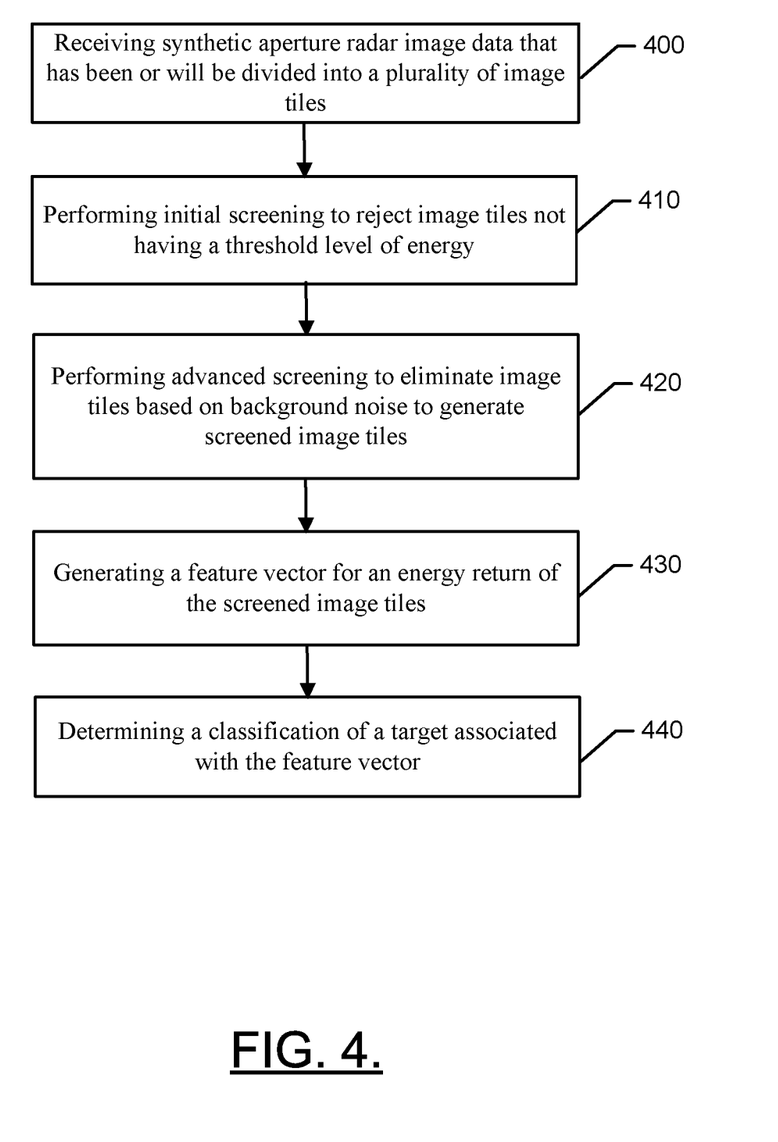
FIG. 4 shows an exemplary block diagram of a method according to an example embodiment.

FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of determining a classification of a target according to one embodiment of the invention is shown in FIG. 4. The method of FIG. 4 may entirely, or at least in part, be executed automatically (e.g., without operator interaction to initiate each step or the series of steps) by processing circuitry. The method may include receiving synthetic aperture radar image data that has been or will be divided into a plurality of image tiles at operation 400. The method may further include performing initial screening to reject image tiles not having a threshold level of energy at operation 410 and performing advanced screening to eliminate image tiles based on background noise to generate screened image tiles at operation 420. The method may further include generating a feature vector for an energy return of the screened image tiles at operation 430 and determining a classification of a target associated with the feature vector at operation 440.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments. In an example embodiment, rejecting image tiles may include rejecting image tiles not having the threshold level of energy responsive to summing energy returns and comparing a standard deviation of summed energy returns to normalized energy in the image tiles. In some examples, the threshold level may be about three to four standard deviations. In an example embodiment, performing advanced screening may include performing statistical consistency checks to eliminate image tiles having the threshold level of energy based on the background noise. In an example embodiment, generating the feature vector may include generating a plurality of feature vectors for a corresponding plurality of energy returns of the screened image tiles. In some examples, generating the plurality of feature vectors may include only generating the plurality of feature vectors for the corresponding energy returns of the screened image tiles. In an example embodiment, generating the classification of the feature vector may include employing a trained model to determine the classification of the feature vector. In some cases, the trained model may be trained to recognize characteristics of a target of interest based on the feature vector. In an example embodiment, generating the classification of the feature vector may include generating a score indicative of a type of target signature that gives rise to the computed feature vector. In some cases, generating the score comprises generating multiple scores for each of a plurality of trained classifiers, each trained classifier corresponding to a different type of target, and wherein the type of target is determined based on the multiple scores.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A detection system comprising processing circuitry configured to:
    receive synthetic aperture radar image data from a synthetic aperture radar mounted on an aircraft or satellite, the synthetic aperture radar image data comprising a plurality of received image tiles;
    perform initial screening to generate a plurality of initially screened image tiles by removing image tiles from the plurality of received image tiles not having a threshold level of energy responsive to summing energy returns and comparing a standard deviation of summed energy returns to normalized energy in the image tiles;
    perform advanced screening on the plurality of initially screened image tiles to eliminate image tiles based on background noise to generate a plurality of advanced screened image tiles;
    generate a feature vector for an energy return of the plurality of advanced screened image tiles; and
    determine a classification of a target associated with the feature vector.

2. The detection system of claim 1, wherein the threshold level is about three to four standard deviations.

3. The detection system of claim 1, wherein performing advanced screening comprises performing statistical consistency checks to eliminate image tiles having the threshold level of energy based on the background noise.

4. The detection system of claim 1, wherein generating the classification of the feature vector comprises employing a trained model to determine the classification of the feature vector.

5. The detection system of claim 4, wherein the trained model is trained to recognize characteristics of a target of interest based on the feature vector.

6. The detection system of claim 1, wherein generating the classification of the feature vector comprises generating a score indicative of a type of target generating the feature vector.

7. The detection system of claim 1, wherein the plurality of received image tiles comprises overlapping image tiles, wherein the overlapping image tiles include up to a 50% overlap in the range and a 75% overlap in the azimuth.

8. A method comprising:
    receiving synthetic aperture radar image data from a synthetic aperture radar mounted on an aircraft or satellite, the synthetic aperture radar image data comprising a plurality of received image tiles;
    performing initial screening to generate a plurality of initially screened image tiles by removing image tiles from the plurality of received image tiles not having a threshold level of energy responsive to summing energy returns and comparing a standard deviation of summed energy returns to normalized energy in the image tiles;
    performing advanced screening on the plurality of initially screened image tiles to eliminate image tiles based on background noise to generate a plurality of advanced screened image tiles;
    generating a feature vector for an energy return of the plurality of advanced screened image tiles; and
    determining a classification of a target associated with the feature vector.

9. The method of claim 8, wherein the threshold level is about three to four standard deviations.

10. The method of claim 8, wherein performing advanced screening comprises performing statistical consistency checks to eliminate image tiles having the threshold level of energy based on the background noise.

11. The method of claim 8, wherein generating the classification of the feature vector comprises employing a trained model to determine the classification of the feature vector.

12. The method of claim 11, wherein the trained model is trained to recognize characteristics of a target of interest based on the feature vector.

13. The method of claim 8, wherein generating the classification of the feature vector comprises generating a score indicative of a type of target generating the feature vector.

* * * * *